(12) United States Patent
Yuan et al.

(10) Patent No.: US 8,904,019 B2
(45) Date of Patent: Dec. 2, 2014

(54) SYSTEMS AND METHODS FOR COMPUTING DEVICE COMMUNICATIONS

(71) Applicant: Google Inc., Mountain View, CA (US)

(72) Inventors: Yuan Yuan, Sunnyvale, CA (US); Timothy Kilbourn, Sunnyvale, CA (US); Kareem Aladdin Nassar, Santa Clara, CA (US); Andrew James Edward Mutton, Sunnyvale, CA (US); Christopher McKillop, Palo Alto, CA (US); Manuel Roman Cuesta, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/803,956

(22) Filed: Mar. 14, 2013

(65) Prior Publication Data

US 2014/0201278 A1    Jul. 17, 2014

Related U.S. Application Data (60) Provisional application No. 61/752,151, filed on Jan. 14, 2013.

(51) Int. Cl.
*G06F 15/16* (2006.01)
*H04L 29/06* (2006.01)

(52) U.S. Cl.
CPC .................................. *H04L 65/403* (2013.01)
USPC ............................ 709/228; 709/232; 709/245

(58) Field of Classification Search
CPC . H04L 65/4084; H04L 65/4092; H04L 67/06; H04L 67/10; H04L 67/125; H04L 67/14; H04L 67/141; H04L 67/24–67/2823; H04L 67/30–67/327; H04L 67/104; H04L 67/1061; H04L 67/1074; H04L 67/1078; H04L 67/1085; H04L 67/1091
See application file for complete search history.

(56) References Cited

U.S. PATENT DOCUMENTS

| | | | |
|---|---|---|---|
| 7,409,569 B2 * | 8/2008 | Illowsky et al. | 713/323 |
| 8,463,740 B2 * | 6/2013 | Laird-McConnell et al. | 707/608 |
| 8,495,221 B1 * | 7/2013 | Tsunoda et al. | 709/226 |
| 2002/0099829 A1 * | 7/2002 | Richards et al. | 709/227 |
| 2005/0289264 A1 * | 12/2005 | Illowsky et al. | 710/104 |
| 2006/0253894 A1 * | 11/2006 | Bookman et al. | 726/2 |
| 2008/0201225 A1 * | 8/2008 | Maharajh et al. | 705/14 |
| 2008/0275960 A1 * | 11/2008 | Myllyla et al. | 709/217 |
| 2009/0216892 A1 * | 8/2009 | Grannan et al. | 709/229 |
| 2011/0022642 A1 * | 1/2011 | deMilo et al. | 707/805 |
| 2011/0125784 A1 * | 5/2011 | Cocheu et al. | 707/769 |
| 2011/0125847 A1 * | 5/2011 | Cocheu et al. | 709/204 |
| 2011/0288946 A1 * | 11/2011 | Baiya et al. | 705/26.1 |
| 2012/0079095 A1 * | 3/2012 | Evans et al. | 709/224 |
| 2012/0079276 A1 * | 3/2012 | Evans et al. | 713/170 |
| 2012/0079606 A1 * | 3/2012 | Evans et al. | 726/28 |

(Continued)

*Primary Examiner* — Patrice Winder
(74) *Attorney, Agent, or Firm* — Troutman Sanders LLP; James E. Schutz; Mark Lehi Jones (57) ABSTRACT

Certain implementations of the disclosed technology may include systems and methods for computing device communications. According to an example implementation of the disclosed technology, a method is provided that can include determining a status and capability of at least one selected computing device, and sending a generated message to the at least one selected computing device. The at least one selected computing device is configured to retrieve content from a source identified by a uniform resource identifier in the message, and the at least one selected computing device is further configured to present the retrieved content.

19 Claims, 5 Drawing Sheets

(56) References Cited

U.S. PATENT DOCUMENTS

| | | |
|---|---|---|
| 2012/0203796 A1* | 8/2012 | Abraham et al. .............. 707/770 |
| 2012/0289147 A1* | 11/2012 | Raleigh et al. ............... 455/3.06 |
| 2012/0311046 A1* | 12/2012 | Grigoriev ...................... 709/206 |
| 2013/0110832 A1* | 5/2013 | Wood et al. ................... 707/736 |
| 2013/0110890 A1* | 5/2013 | Bailor ........................... 707/827 |
| 2013/0110892 A1* | 5/2013 | Wood et al. ................... 707/827 |
| 2013/0137393 A1* | 5/2013 | Sverdlov et al. .............. 455/406 |
| 2013/0166580 A1* | 6/2013 | Maharajh et al. ............. 707/758 |
| 2013/0166697 A1* | 6/2013 | Manning ....................... 709/219 |
| 2013/0174031 A1* | 7/2013 | Constantinou ................ 715/256 |
| 2013/0178241 A1* | 7/2013 | Duggirala et al. ......... 455/550.1 |
| 2013/0227076 A1* | 8/2013 | Conley .......................... 709/219 |
| 2013/0262559 A1* | 10/2013 | Neerings et al. .............. 709/203 |

\* cited by examiner

SYSTEMS AND METHODS FOR COMPUTING DEVICE COMMUNICATIONS

RELATED APPLICATIONS

This application is related to provisional application Ser. No. 61/752,151, filed on Jan. 14, 2013, entitled: "Systems and Methods for Computing Device Communications," the contents of which are hereby incorporated by reference in their entirety.

BACKGROUND

Computing devices can be utilized in numerous applications for providing convenient access to information and entertainment content. Examples of typical computing devices include smart phones, computer tablets, information appliances, and personal digital assistants (PDAs). Certain forms of computing devices can be used with home entertainment systems, and such devices may provide user-friendly access to music, videos, web surfing, etc. Some of the challenges associated with information devices include setup, security, content management and content delivery in a way that is convenient for the end user.

BRIEF SUMMARY

Some or all of the above needs may be addressed by certain implementations of the disclosed technology. Certain implementations of the disclosed technology may include systems and methods for information appliance communications.

According to an example implementation of the disclosed technology, a computer-implement method is provided that includes receiving, at a server, dynamic registry information for one or more computing devices, registering, at the server, the one or more computing devices based at least in part on the received dynamic registry information, and determining, at the server, a status and a capability of the one or more computing devices based at least in part on the received dynamic registry information.

The method also includes receiving, at the server, an indication of user-selected content for presentation by the one or more registered computing devices, generating, at the server, a message comprising a uniform resource identifier (URI) corresponding to a source for the user-selected content, and selecting at least one of the one or more registered computing devices for presenting the content.

Based on determining the status and capability of the at least one selected computing device, the method includes sending the generated message to the at least one selected computing device, wherein the at least one selected computing device is configured to retrieve the content from the source identified by the URI in the message, and wherein the at least one selected computing device is further configured to present the retrieved content.

According to another example implementation, a system is provided that includes at least one memory for storing data and computer-executable instructions, and at least one processor configured to access the at least one memory and further configured to execute the computer-executable instructions to cause the systems to receive dynamic registry information for one or more computing devices, register the one or more computing devices based at least in part on the received dynamic registry information, and determine a status and a capability of the one or more computing devices based at least in part on the received dynamic registry information.

The at least one processor is further configured to execute the computer-executable instructions to receive an indication of user-selected content for presentation by at least one selected registered computing devices, and generate a message comprising a uniform resource identifier (URI) corresponding to a source for the user-selected content. Based on determining the status and capability of the at least one selected computing device, the at least one processor is further configured to execute the computer-executable instructions to send the generated message to the at least one selected computing device, wherein the at least one selected computing device is configured to retrieve the content from the source identified by the URI in the message, and wherein the at least one selected computing device is further configured to present the retrieved content.

According to another example implementation, a computer-readable medium is provided that stores instructions executable by one or more processors to perform a method comprising receiving, at a server, dynamic registry information for one or more computing devices, registering, at the server, the one or more computing devices based at least in part on the received dynamic registry information, and determining, at the server, a status and a capability of the one or more computing devices based at least in part on the received dynamic registry information. The method also includes receiving, at the server, an indication of user-selected content for presentation by the one or more registered computing devices, generating, at the server, a message comprising a uniform resource identifier (URI) corresponding to a source for the user-selected content, and selecting at least one of the one or more registered computing devices for presenting the content. Based on determining the status and capability of the at least one selected computing device, the method includes sending the generated message to the at least one selected computing device, wherein the at least one selected computing device is configured to retrieve the content from the source identified by the URI in the message, and wherein the at least one selected computing device is further configured to present the retrieved content According to an example implementation of the disclosed technology, a computer-implemented method is provided that includes receiving, at a computing device, based at least in part on the transmitted dynamic registry information that includes registration information for the information appliance, a message comprising a uniform resource identifier (URI) corresponding to a source for display content. The method also includes retrieving, at the computing device, the content from the source identified by the URI, launching, at the computing device, an application associated with the retrieved content; and presenting the content. In certain example embodiments, presenting the content comprises generating one or more of images, rich web content, custom visualization, animation, sound, an update, a setup, scheduled content, or a configuration.

Other implementations, features, and aspects of the disclosed technology are described in detail herein and are considered a part of the claimed disclosed technologies. Other implementations, features, and aspects may be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Implementations of the disclosed technology will be described more fully hereinafter with reference to the accompanying drawings, in which implementations of the disclosed technology are shown. This disclosed technology may, however, be embodied in many different forms and should not be construed as limited to the implementations set forth herein; rather, these implementations are provided so that this disclosure will be thorough and complete, and will fully convey the scope of the disclosed technology to those skilled in the art.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Certain example implementations of the disclosed technology may address the need for sharing content (for example, movies, music, applications, information, etc.,) across different computing devices that are connected to the Internet. For example, a laptop or desktop computer may have a large screen size, full keyboard, fast Internet connection, and other ergonomic and speed advantages over a low-cost entertainment-type information appliance box that, for example, may provide an Internet connection for use with a user's television or entertainment center. A user, in this example scenario, may find it convenient or desirable to search for, and select content using the desktop computer, and cause the selected content to display, play, launch, etc., on the entertainment center via the information appliance. In an example implementation of the disclosed technology, a framework for computing device communication may allow the user to share content in this manner with qualified devices that are connected to the Internet. Such qualified devices may include mobile computing devices (for example, a smart phone or tablet computer), information appliances, and traditional computing devices such as a laptop or desktop computer.

Another aspect that may be addressed by certain example implementations of the disclosed technology include ability remotely determine the status and capability of the qualified device so that, for example, the user may know if the device is online, properly connected, and whether or not it is capable of handling the selected content. Such communications may be achieved by providing an Internet connection between the first device (for selection of the content) and one or more additional devices (for playing the content). An example implementation of the disclosed technology provides a secure communications framework that allows securely selecting content on a first device, and causing the content to launch on one or more remote qualified device(s) while "listening" to the remote device(s) to determine status and capability.

In certain example implementations of the disclosed technology, communications between qualified devices may be utilized within a confined local-area-network (such as a Wi-Fi network); however, the scope of the disclosed technology provides communications between devices that are connected to the Internet without requiring the devices to be on the same logical local-area-network. For devices that are on the same local-area-network, a secure socket layer (SSL) may be established SSL connections over Transmission Control Protocol (TCP) and Internet Protocol (IP) and a remote procedure call (RPC) requests and responses may be exchanged over this connection. In one example embodiment, RPC may be an inter-process communication that allows a computer program to cause a subroutine or procedure to execute in another address space (commonly on another computer on a shared network) without the programmer explicitly coding the details for this remote interaction.

According to an example embodiment, a cloud RPC service is disclosed that may allow communication and synchronization of data between different devices via a cloud connection. In certain example implementations, the devices are not required to be on the same local-area-network. In an example implementation, the cloud RPC service may be utilized to send remote procedure calls from one device (such as a smart phone or web browser) to devices on another network. In one example implementation, instead of needing to write native software to establish the SSL/TCP connections that are used from the smart phone, the web browser can go through a cloud bridge to send control commands and query the state of the remote device.

As an example, consider the scenario where a user's mobile device (such as a smart phone) may have faster internet connection through a fourth generation (4G) signal than it can get via an available Wi-Fi network that is connected to the Internet. According to an example implementation of the disclosed technology, if the user desires to control an information appliance that is connected to the Wi-Fi network, broker software running on the mobile device may be utilized to route the RPCs through a cloud bridge without the needing to join the Wi-Fi network.

In accordance with an example implementation of the disclosed technology the cloud RPC, may include one or more of the following: (1) a frontend for high level interaction with the various services; (2) service discovery outside the local network; (3) RPC marshaling from the front end service to the format understood by the devices; (4) a security model for web-based access; (5) routing of RPC requests and responses between different networks; and (6) relaying of cloud RPCs to the appropriate service on the device.

According to an example implementation, the frontend may be utilized to expose a high-level interface to the various services. In an example implementation, service discovery devices may periodically upload a list of running services to the cloud bridge, which may store the list for future retrieval. In an example implementation, the frontend application programming interface (API) may query the cloud bridge to display the services to the user. According to an example implementation, RPC marshaling may be accomplished by employing a custom RPC format for transmitting data. For example, a cloud RPC from the cloud bridge may use the same RPC format, to simplify the client code that receives the RPCs.

In accordance with an example implementation, security may be implemented by authenticated and authorized self-signed certificates. In one embodiment, the certificates may be distributed to the qualified devices that participate in the service. In an example implementation that utilizes cloud RPCs that come from web apps (and thus no device based certificate will have been created for them), the frontend may create a new certificate for web-initiated RPCs, and the cloud bridge may propagate them as it does any other authorized certificate.

According to an example implementation, routing requests and responses may be handled by cloud messaging, for example, to push messages to devices. Cloud messaging may also be utilized to route cloud RPCs, via the identification of the device running the service. Since cloud messaging may be asynchronous, the cloud bridge may embed "return address" information in the request so it will be able to route the response to the original sender. According to certain example embodiments relaying cloud RPCs on the device running the service may utilize a broadcast receiver to receive the cloud messaging tickle and relay the payload as an RPC to the intended recipient.

In accordance with an example implementation of the disclosed technology, a key store may be utilized to store derived keys used to encrypt/decrypt a user's web credentials. In an example implementation, a server may store the encrypted web credentials, the list of services available, and the routing info needed to send cloud RPCs.

Certain implementations of the disclosed technology may enable cost-effective and efficient deployment and configuration of communications devices and associated displays. Example implementations may enable efficiently controlling content for display or presentation on such devices. In certain example implementations, the content may include sound, video, rich web applications, web pages, images, machine control, updates, etc. The use of the terms presentation or presenting herein is defined to mean any appropriate expression of the content on the targeted device. For example, presentation may mean producing a visual image representation of selected content on a targeted screen or display. In another example, presentation may mean reproducing sounds, and so forth. According to example implementations, sound may include music, speech, sequences of sound, midi triggers, etc. According to certain example implementations, a cloud-based internet system, as described above may be utilized for securely sending uniform resource identifiers (URIs) of desired content to qualified selected devices, such as TVs, tablets, mobile devices, information appliances, etc. In accordance with a example implementation, the selected display devices may be sent the URI for the desired content from any browser or qualified device.

According to certain example implementations, a custom service or application may be installed on the computing device device to register the device with a server. Once registered, and according to an example implementation, the custom service or application may enable the registered device to listen for updates from a central server and/or be controlled remotely. In certain example embodiments, the registration process may provide the registration server with information that allows the registration server to determine the capabilities of the device, so that, for example, if the computing device does not have the capability for presenting video, then it may not be selected for applications that require video.

According to an example implementation, when the target device receives the URI, it may create a software object known as an Intent. Those skilled in the art are familiar with an Intent which may include, but is not limited to action, data, and/or other associated attributes. In one example implementation, based on the received URI, the Intent information can be handled by the device's operating system in an appropriate manner. For example, upon receiving a URI "http://www.youtube.com/v/MyC0o1V1d3o," the device operating system may create the action of opening up a specific YouTube player on the device instead of opening a web browser, and upon receiving the URI, the device may "pull" the content with identification "MyC0o1V1d3o" from a YouTube server.

Certain example implementations of the disclosed technology may also be utilized to format, send and/or receive other various information to/from the device. For example, maintenance commands, scheduling for different content, notification of software updates from the server, requests for sensor data or logs, and pings to determine continued availability and/or status.

In accordance with certain example implementations, a custom operating system may be utilized for controlling access to protected content. For example, a client may access content restricted to its domain by running the custom system with a domain-authenticated account. In one example implementation, an operating system employing cloud messaging may be utilized on the devices to enable content security and control of the devices. In accordance with certain example implementations, cloud messaging may provide push notifications to the device, eliminating the need for polling a server from the device, or for a persistent network connection. According to certain example implementations, cloud messaging capabilities may be built into the device platform, which may enable any qualified device (with an updated operating system) to be utilized for receiving the push messages and pulling the identified content for presentation.

In certain example implementations, a message from the central server to the device may need to contain information that exceeds a limitation for cloud messaging. For example, currently, C2DM cloud to device messaging (C2DM) messages are limited to a 1024 bit length, and according to certain example implementations, such limitations may be handled for overly-long messages by sending a follow-on notification containing a URI pointing back to the server itself (similar to a URL shortening service). For example a message with the following long URL link: "http://www.myreally . . . <2048 bytes> . . . longurl.com" may be sent to the device as a short key "http://server/12345" or pointer to a URL on the server which, when accessed by the device, returns the original long URL that can then be acted on as usual. In this way, network round trips only need to be utilized for those URLs that are too long to be messaged within the C2DM length limit. In accordance with example implementations, the disclosed technology may utilize cloud messages that are shorter or longer than the current C2DM 1024-byte length limit, as such systems may change with new standards, technology, available bandwidth, etc. For example, C2DM messages having a limit length of 2048 bytes or greater may be available. Therefore, implementations of the disclosed technology are not limited by the current C2DM length limit.

According to certain example implementations, certain URIs whose cloud message would be over the limit for a single message may be handled by disassembling the long message and sending it as a series of short messages to the device, where it may be reassembled. For example, a central server may break the long URI into fragments which are each sent in a messages from which the remote device reassembles the fragments into the original URI, that can then be utilized to initiate an action. According to another example implementation, a central server may construct a unique, sufficiently short URI, which may sent in a single message that the remote device may then utilize to get the content. In an example implementation, a URL shortening service may be implemented either on the central server or via an external service.

In accordance with example implementations, the remote devices/displays may be controlled remotely by an authorized entity or owner. The authorized entity, or owner may limit access to the devices/displays, for example, to avoid display of inappropriate content or other abuses.

In certain example implementations, a specific, targeted message may be sent to one individual remote device/display, which may in turn initiate the device/display to pull content from a specific source for presentation on the display. According to another example implementation, multiple devices/displays may be grouped for bulk control of content or updates. For example, an authorized entity may select all displays in reception areas worldwide for content updates. In another example implementation, content may be scheduled. According to certain example implementations, content may be scheduled for display with primary content scheduled for certain periods, secondary content scheduled for other periods, and so forth. For example, between the hours of 9 am and 5 pm, content from a first URL may be displayed. Otherwise, content from a second URL may be displayed. According to an example implementation, content may be stored on a system in communication with the cloud messaging server to enable resending favorites or history.

Example implementations may utilize push technology for digital signage. For example, a cloud messaging system may be utilized as a push mechanism to send user's content choices (URIs) to devices, which may include digital signage. According to an example implementation, the message system may also provide instructions that are not necessarily user-specified URIs, for example system commands, updates, etc., may be provided to one or more devices.

According to example implementations of the disclosed technology, various components, systems and methods for disseminating content to remote devices will now be described with reference to the accompanying figures.

Figure 1:
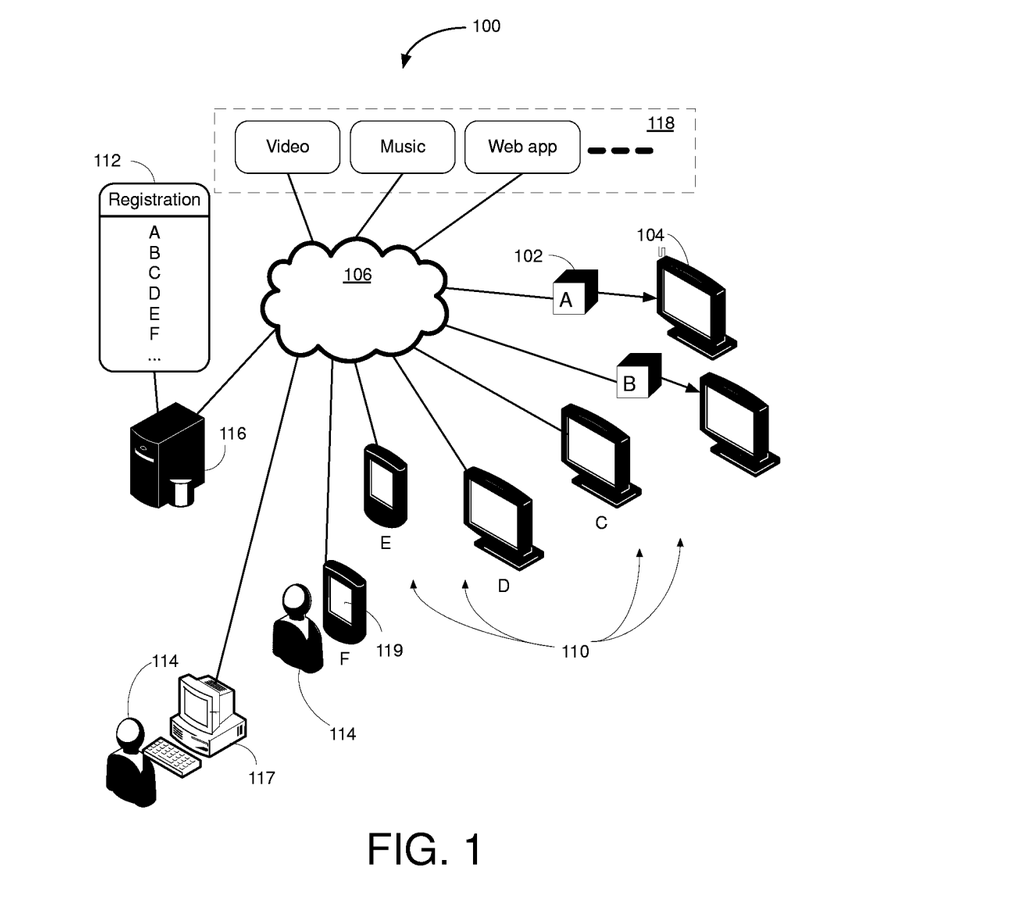
FIG. 1 is a block diagram of an illustrative computing device content dissemination system 100, according to an example implementation of the disclosed technology.

FIG. 1 illustrates a computing device content dissemination system 100 in accordance with certain example implementations. In one implementation, one or more remote devices 110 may be in communication with an Internet connection 106. In an example implementation, the Internet connection 106 may include a local area network, a wide area network, the cloud, etc. According to certain example implementations, the one or more remote devices 110 may communicate wired or wirelessly with the Internet connection 106. According to one implementation, a remote device 110 may include a computing device unit 102 and a display unit 104. For example, the computing device unit 102 may include an Android-based device that has cloud messaging functionality. In other example implementations, the information unit 102 and a display unit 104 may be integrated into a single remote device 110.

In accordance with example implementations, content may be disseminated to the devices 110 after they are registered. Registration, for example, with each individual device 110 may be utilized for discovery, control, authorization, security, listening, and/or subsequent communications with the device 110. According to an example implementation, the devices 110 may include an application or operating system component to initiate communications with the central server 116 upon connection to the Internet 106. In one example implementation, an operating system associated with the device 110 may check for updates to the firmware or operating system when the device 110 is connected to the Internet 106. In one implementation, the update process may initiate registration of the device 110 with the central server 116. In another implementation, registration of the device 110 with the central server 116 may be initiated when the device 110 detects an Internet connection 106.

According to one example implementation, during registration, the central server 116 may communicate with the individual device 110 to exchange registration information, security keys, device-specific information, etc. According to an example implementation, the central server 116 may store the registration information 112 for each detected device 116. In an example implementation, an ongoing process may be utilized to periodically update information about the devices 110, for example, to determine the capabilities of the device 110, if certain cables are plugged in, if the device is powered up, etc. In one example implementation, initial and/or subsequent communications with the device 110 involving cloud messages for content dissemination may include checking or verifying the device status information.

In accordance with certain example implementations, an authorized user 114 may be established during the registration process, and subsequently validated via password, authorization code, secure encryption key exchange, etc. In an example implementation, once the registration process has completed and an authorized user 114 has been established, the authorized user 114 may initiate content dissemination to any of the registered individual devices 110 for which user is authorized to control. According to example implementations, the authorized user 114 may communicate with the central server 116 and/or a specific content source 118 via workstation 117, personal computer, server, mobile computing device 119, smart phone, etc.

According to an example implementation of the disclosed technology, a content source 118 may include a website, a music application, a movie repository, a web app, etc. In one example implementation, a website associated with the content source 118 may include code that enables a user to select one or more of their authorized device 110 for dissemination of content. For example, a movie repository may include a logon screen for verifying logon credentials that may be linked to the user's device account. Once logged on, for example, the website associated with the content source 118 may check the central server 116 for status and capability information associated with the user's authorized devices 110. According to an example implementation, and depending on the type of content selected for dissemination, only those authorized devices 110 having the required capability to present the content may show up as a selectable device. In an example implementation, authorized devices 110 with the correct capability may be listed with status information. For example, the device 110 may have its HDMI cable unplugged and may report this as a status so that the central server 116 and/or the content source 118 may provide such information to the user.

In accordance with certain example implementations of the disclosed technology, and as previously discussed, a specific, targeted message may be sent to an individual remote device 102 or multiple devices 110, which may in turn, initiate the device(s) 110 to pull content from a specific content source 118 for presentation on the device(s) 110 and/or separate devices 102 and associated displays 104. For example, the content source 118 may include web pages, images, rich web applications, video, audio, text, movies, music, etc. According to example implementations, the initiation of content dissemination to a device 110 by an authorized user 114, for example, may involve communications with the central server 116, which may produce or format a cloud message based on the content source 118, the registration information 112, and/or the status and capability of the device(s) 110. According to an example implementation, and as previously discussed, the generated cloud message may then be sent to the individual device(s) 110 and the cloud message may initiate the device(s) 110 to pull the selected content from the specified content source 118.

Figure 2:
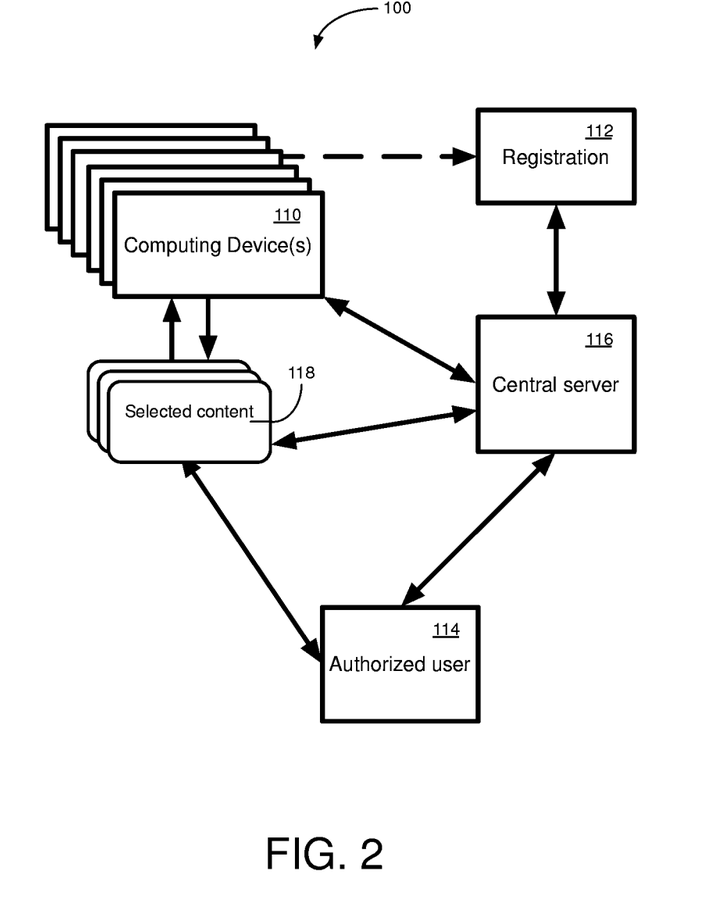
FIG. 2 is another illustrative block diagram view of the computing device content dissemination system 100, according to an example implementation of the disclosed technology.

FIG. 2 depicts another illustrative block diagram view of the computing device content dissemination system 100, showing the various interactions that may transpire according to an example implementation of the disclosed technology. For example, the device(s) 110, upon detection of an Internet connection, may communicate with a central server 116, to establish registration 112 of the device with the central server 116. Optionally, the device(s) 110 may communicate directly with a registration server 112, which may be in communication with the central server 116. Once registration is established with the device(s) 110, an authorized user 114 may select one or more registered devices 110 and the desired content from one or more content sources 118. In an example implementation, the central server 116 may format and send a cloud message to the selected device(s) 110 with an address of the selected content and the device(s) 110 may then pull the selected content from the content source 118. Accordingly, implementations of the disclosed technology may eliminate unnecessary traffic through the central server 116. Implementations of the disclosed technology may further enable a user to control content presentation on one of their devices remotely from another device through the Internet.

Various implementations of the communication systems and methods herein may be embodied in non-transitory computer readable media for execution by a processor. An example implementation may be used in an application of a mobile computing device, such as a smartphone or tablet, but other computing devices may also be used, such as to portable computers, tablet PCs, Internet tablets, PDAs, ultra mobile PCs (UMPCs), information appliances, etc.

Figure 3:
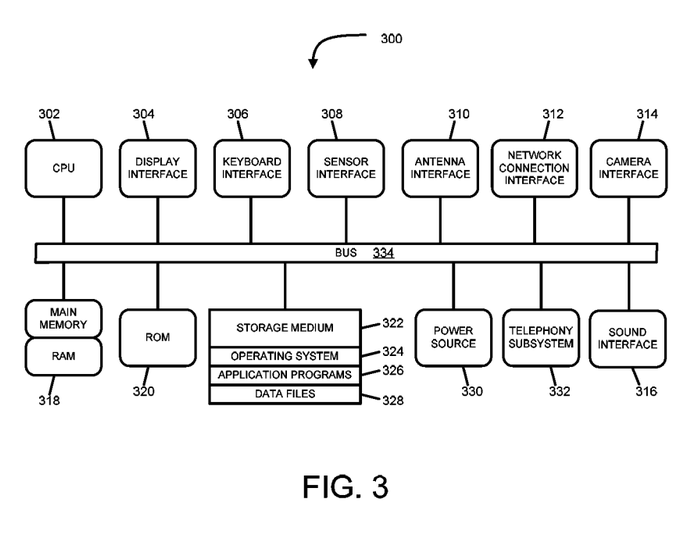
FIG. 3 is a block diagram of an illustrative system architecture 300, according to an example implementation of the disclosed technology.

FIG. 3 depicts a block diagram of an illustrative computer system architecture 300 according to an example implementation. Certain aspects of FIG. 3 may be embodied one or more devices (for example, the devices 102, 110, 119 as shown in FIG. 1). Various implementations and methods herein may be embodied in non-transitory computer readable media for execution by a processor. It will be understood that the architecture 300 is provided for example purposes only and does not limit the scope of the various implementations of the communication systems and methods.

The architecture 300 of FIG. 3 includes a central processing unit (CPU) 302, where computer instructions are processed; a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile device. In another example implementation, the display interface 304 may be configured for providing data, images, and other information for an external/remote display that may not necessarily be integrated with the device. For example, a desktop monitor may be utilized for mirroring graphics and other information that is presented on a mobile device. In certain example implementations, the display interface 304 may wirelessly communicate, for example, via a Wi-Fi channel or other available network connection interface 312 to the external/remote display.

The architecture 300 may include a keyboard interface 306 that provides a communication interface to a keyboard; and a sensor interface 308 that, for example, may provides a communication interface to a pointing device or touch screen. Example implementations of the architecture 300 may include an antenna interface 310 that may provide a communication interface to an antenna; a network connection interface 312 that may provides a communication interface to a network and/or the Internet. As mentioned above, the display interface 304 may be in communication with the network connection interface 312, for example, to provide information for display on a remote display that is not directly connected or attached to the system. In certain implementations, a camera interface 314 is provided that may serve as a communication interface and may provide functions for capturing digital images from a camera. In certain implementations, a sound interface 316 is provided as a communication interface for converting sound into electrical signals using a microphone and/or for converting electrical signals into sound using a speaker. According to example implementations, a random access memory (RAM) 318 is provided, where computer instructions and data may be stored in a volatile memory device for processing by the CPU 302.

According to an example implementation, the architecture 300 includes a read-only memory (ROM) 320 where invariant low-level system code or data for basic system functions such as basic input and output (I/O), startup, or reception of keystrokes from a keyboard are stored in a non-volatile memory device. According to an example implementation, the architecture 300 may include a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, and or other applications, as necessary) and data files 328 are stored. In an example implementation, the application programs 326 may include a cloud messaging module for preparing and formatting cloud to device messages. In an example implementation, the application programs 326 may include a registration module for registering devices (such as devices 110 in FIG. 1 or FIG. 2).

According to an example implementation, the architecture 300 includes a power source 330 that provides an appropriate alternating current (AC) or direct current (DC) to power components. According to an example implementation, the architecture 300 may include a telephony subsystem 332 to allow the device 300 to transmit and receive sound over a telephone network. The constituent devices and the CPU 302 may communicate with each other over a bus 334.

In accordance with an example implementation, the CPU 302 has appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data may be stored in the RAM 318, where the data may be accessed by the computer CPU 302 during execution. In one example configuration, the device 300 includes at least 128 MB of RAM, and 256 MB of flash memory The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

Figure 4:
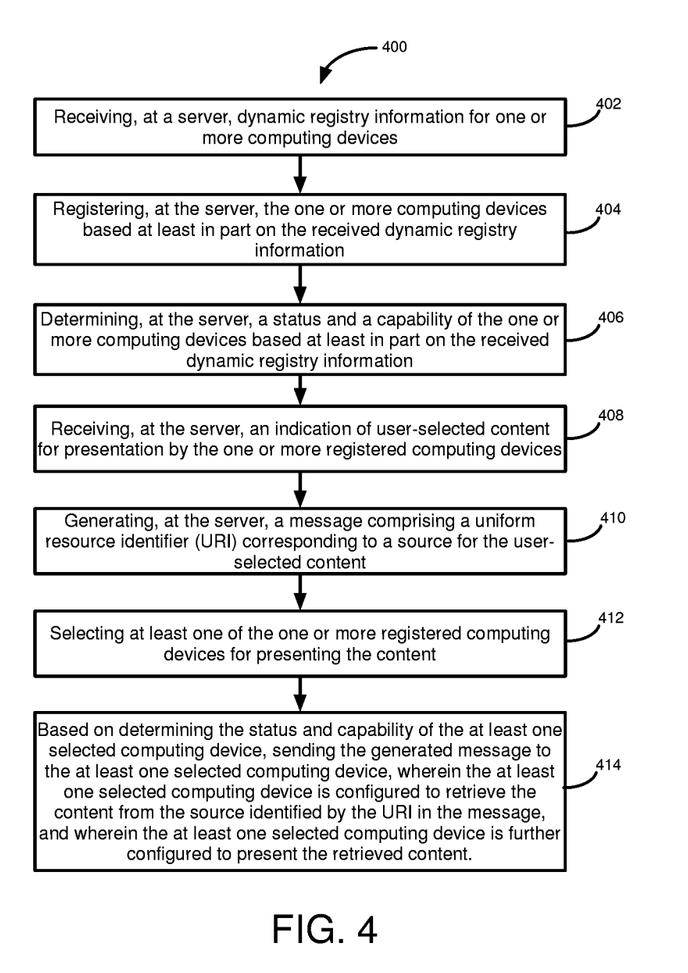
FIG. 4 is a flow diagram of an example method according to an example implementation of the disclosed technology.

An example method 400 for disseminating content to a device will now be described with reference to the flowchart of FIG. 4. The method 400 starts in block 402, and according to an example implementation of the disclosed technology includes receiving, at a server, dynamic registry information for one or more computing devices. Dynamic registry information, for example, may include registry information that is updatable and/or that may be changeable by new registry information. In block 404, the method 400 includes registering, at the server, the one or more computing devices based at least in part on the received dynamic registry information. In block 406, the method 400 includes determining, at the server, a status and a capability of the one or more computing devices based at least in part on the received dynamic registry information. In block 408, the method 400 includes receiving, at the server, an indication of user-selected content for presentation by the one or more registered computing devices. In block 410, the method 400 includes generating, at the server, a message comprising a uniform resource identifier (URI) corresponding to a source for the user-selected content. In block 412, the method 400 includes selecting at least one of the one or more registered computing devices for presenting the content. In block 414, the method 400 includes sending the generated message to the at least one selected computing device based on determining the status and capability of the at least one selected computing device, wherein the at least one selected computing device is configured to retrieve the content from the source identified by the URI in the message, and wherein the at least one selected computing device is further configured to present the retrieved content.

Example implementations of the disclosed technology further include systems, methods and computer readable media for receiving, at the server, user credential information related to the one or more computing devices and controlling the generated message based at least in part on the user credential information. In an example implementation, the selected computing device is further configured to send dynamic registry information to the server, wherein the dynamic registry information includes real-time capability information associated with the one or more computing devices. An example implementation further includes associating the content with one or more corresponding default applications for opening and presenting the retrieved content at the at least one selected computing device. In an example implementation, sending the generated message to the at least one selected registered remote device includes sending information for generating one or more of images, rich web content, custom visualizations, sound, an update, a setup, a configuration, or scheduling information.

Figure 5:
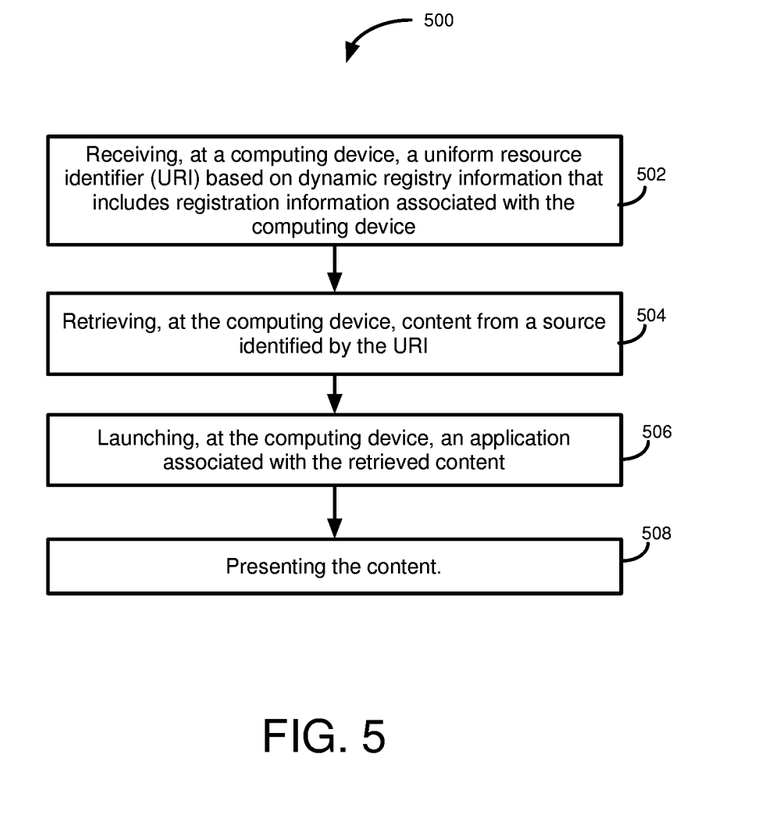
FIG. 5 is a flow diagram of another example method according to an example implementation of the disclosed technology.

An example method 500 for registering a device will now be described with reference to the flowchart of FIG. 5. The method 500 starts in block 502, and according to an example implementation of the disclosed technology includes receiving, at a computing device, a uniform resource identifier (URI) based on dynamic registry information that includes registration information associated with the computing device. In block 504, the method 500 includes retrieving, at the computing device, content from a source identified by the URI. In block 506, the method 500 includes launching, at the computing device, an application associated with the retrieved content. In block 508, the method 500 includes. presenting the content at the computing device.

An example implementation of the method may also include transmitting from computing device, dynamic registry information to a registration database. In an example implementation, presenting the content includes generating one or more of images, rich web content, custom visualization, animation, sound, an update, a setup, scheduled content, or a configuration.

Example implementations of the disclosed technology further include systems, methods and computer readable media for associating a default application with one or more of information in the URI or information in the retrieved content. An example implementation includes associating the content with one or more corresponding default applications for opening and presenting the content.

According to example implementations, presenting the content comprises generating one or more of images, rich web content, custom visualization, animation, sound, an update, a setup, a configuration, or scheduling. Example implementations include associating the content with corresponding default applications for opening and presenting the content. An example implementation includes receiving a message that is less than or equal to a cloud-to-device-messaging length limit. In one example implementation, receiving the message includes receiving a message that is less than or equal 1024 bytes. In one example implementation, receiving the message includes receiving a message that is less than or equal 2048 bytes. In one example implementation, receiving the message includes receiving a message that is less than or equal 4096 bytes. Example implementations further include receiving a secondary reference URI associated with a primary URI when length restrictions are exceeded in the message, wherein the secondary reference URI corresponds to the source for the content.

In an example implementation, transmitting the dynamic registry information includes transmitting a status of the one or more computing devices. In an example implementation, transmitting the dynamic registry information includes transmitting a capability of the one or more computing devices.

According to example implementations, certain technical effects can be provided, such as creating certain systems and methods that provide efficient content dissemination to remote devices for presentation. Example implementations of the disclosed technology can provide the further technical effects of providing systems and methods for utilizing one device to control content for presentation on one or more remote devices.

In example implementations of the disclosed technology, the computing device dissemination system 100 and/or the system architecture 300 may include any number of hardware and/or software applications that are executed to facilitate any of the operations. In example implementations, one or more I/O interfaces may facilitate communication between the computing device dissemination system 100 and/or the system architecture 300 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device dissemination system 100 and/or the system architecture 300. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device dissemination system 100 and/or the system architecture 300 inputs and outputs to one or more suitable networks and/or connections; for example, the connections that facilitate communication with any number of peripherals associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As desired, implementations of the disclosed technology may include the dissemination system 100 and/or the control system 300 with more or less of the components illustrated in FIGS. 1-3.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed disclosed technology is:

1. A computer-implemented method comprising:
   receiving, at a server, dynamic registry information for two or more computing devices;
   registering, at the server, the two or more computing devices based at least in part on the received dynamic registry information;
   determining, at the server, a status and a capability of the two or more computing devices based at least in part on the received dynamic registry information;
   receiving, at the server, and from a first computing device of the two or more registered computing devices, an indication of user-selected content for presentation by a second computing device of the two or more registered computing devices;

generating, at the server, a message comprising a uniform resource identifier (URI) corresponding to a source for the user-selected content;

selecting, by the first computing device, the second computing device of the two or more registered computing devices for presenting the content wherein the second computing device is not the first computing device; and based on determining the status and capability of the selected second computing device, sending the generated message to the selected second computing device, wherein the selected second computing device is configured to retrieve the content from the source identified by the URI in the message, and wherein the selected second computing device is further configured to present the retrieved content.

2. The method of claim 1, further comprising receiving, at the server, user credential information related to the two or more computing devices and controlling the generated message based at least in part on the user credential information.

3. The method of claim 1, wherein the selected second computing device is further configured to send dynamic registry information to the server.

4. The method of claim 1, wherein the dynamic registry information includes real-time capability information associated with the two or more computing devices, wherein the dynamic registry information is changeable by new registry information.

5. The method of claim 1, wherein the two or more computing devices are located remotely from the server.

6. The method of claim 1, further comprising associating the content with one or more corresponding default applications for opening and presenting the retrieved content at the selected second computing device.

7. The method of claim 1, wherein sending the generated message to the selected second computing device comprises sending information for generating one or more of images, rich web content, custom visualizations, sound, an update, a setup, or a configuration.

8. A system comprising:
at least one memory for storing data and computer-executable instructions; and
at least one processor configured to access the at least one memory and further configured to execute the computer-executable instructions to cause the system to:
receive dynamic registry information for two or more computing devices;
register the two or more computing devices based at least in part on the received dynamic registry information;
determine a status and a capability of the two or more computing devices based at least in part on the received dynamic registry information;
receive from a first computing device of the two or more registered computing devices, an indication of user-selected content for presentation by a selected second computing device of the two or more registered computing devices, wherein the second computing device is not the first computing device;
generate a message comprising a uniform resource identifier (URI) corresponding to a source for the user-selected content; and
based on determining the status and capability of the selected second computing device, send the generated message to the-selected second computing device, wherein the selected second computing device is configured to retrieve the content from the source identified by the URI in the message, and wherein the selected second computing device is further configured to present the retrieved content.

9. The system of claim 8, wherein the at least one processor is further configured to receive user credential information related to the two or more computing devices and to control the generated message based at least in part on the user credential information.

10. The system of claim 8, wherein the dynamic registry information includes real-time capability information associated with the two or more computing devices.

11. The system of claim 8, wherein the selected second computing device is further configured with one or more corresponding default applications for opening and presenting the retrieved content.

12. The system of claim 8, wherein sending the generated message to the selected second computing device comprises sending information for generating one or more of images, rich web content, custom visualizations, sound, an update, a setup, or a configuration.

13. A computer-readable medium that stores instructions executable by one or more processors to perform a method comprising:
determining, at a server, a status and a capability of two or more computing devices based at least in part on received dynamic registry information;
receiving, at the server, an indication of user-selected content for presentation by the two or more registered computing devices;
generating, at the server, a message comprising a uniform resource identifier (URI) corresponding to a source for the user-selected content;
selecting, by a first computing device of the two or more registered computing devices, a second computing device of the two or more registered computing devices for presenting the content, wherein the second computing device is not the first computing device; and
based on determining the status and capability of the selected second computing device, sending the generated message to the selected second computing device, wherein selected second computing device is configured to retrieve the content from the source identified by the URI in the message, and wherein the selected second computing device is further configured to present the retrieved content.

14. The computer-readable medium of claim 13, further comprising:
receiving, at the server, user credential information related to the two or more computing devices and controlling the generated message based at least in part on the user credential information.

15. The computer-readable medium of claim 13, wherein the selected second computing device is further configured to send dynamic registry information to the server.

16. The computer-readable medium of claim 13, wherein the dynamic registry information includes real-time capability information associated with the two or more computing devices.

17. The computer-readable medium of claim 13, wherein the two or more computing devices are located remotely from the server.

18. The computer-readable medium of claim 13, further comprising associating the content with one or more corresponding default applications for opening and presenting the retrieved content at the selected second computing device.

19. The computer-readable medium of claim 13, wherein sending the generated message to the selected second computing device comprises sending information for generating one or more of images, rich web content, custom visualizations, sound, an update, a setup, or a configuration.

\* \* \* \* \*